United States Patent
Hellebrand et al.

(10) Patent No.: US 10,375,752 B2
(45) Date of Patent: Aug. 6, 2019

(54) MOBILE COMMUNICATION TERMINAL AND SYSTEM WITH A MOBILE COMMUNICATION TERMINAL

(71) Applicants: Hans-Martin Hellebrand, Dortmund (DE); Andreas Berger, Oberwiera (DE); Stefan Padberg, Essen (DE)

(72) Inventors: Hans-Martin Hellebrand, Dortmund (DE); Andreas Berger, Oberwiera (DE); Stefan Padberg, Essen (DE)

(73) Assignee: innogy Innovation GmbH, Essen (DE)

( * ) Notice: Subject to any disclaimer, the term of this patent is extended or adjusted under 35 U.S.C. 154(b) by 0 days.

(21) Appl. No.: 16/035,242

(22) Filed: Jul. 13, 2018

(65) Prior Publication Data
US 2018/0324885 A1    Nov. 8, 2018

Related U.S. Application Data

(63) Continuation of application No. PCT/EP2016/052949, filed on Feb. 12, 2016.

(60) Provisional application No. 62/278,557, filed on Jan. 14, 2016.

(51) Int. Cl.
| | |
|---|---|
| *H04W 76/15* | (2018.01) |
| *H04L 25/14* | (2006.01) |
| *H04W 72/04* | (2009.01) |

(52) U.S. Cl.
CPC .............. *H04W 76/15* (2018.02); *H04L 25/14* (2013.01); *H04W 72/0453* (2013.01)

(58) Field of Classification Search
CPC ............................... H04L 25/14; H04W 76/15
See application file for complete search history.

(56) References Cited

U.S. PATENT DOCUMENTS

| | | |
|---|---|---|
| 2005/0163093 A1 | 7/2005 | Garg et al. |
| 2013/0329550 A1 | 12/2013 | Kotecha et al. |

FOREIGN PATENT DOCUMENTS

EP        2 518 958 A1    10/2012

*Primary Examiner* — James P Duffy
(74) *Attorney, Agent, or Firm* — Reinhart Boerner Van Deuren P.C.

(57) ABSTRACT

Provided are embodiments of a mobile communication terminal with a data generation unit arranged for generating a data stream, a data serialization unit arranged for segmenting the data stream into at least two distinct data packets, and a channel broker unit. The channel broker unit is connected to the serialization unit to receive the at least two data packets and to select for each of the data packets a bearer channel out of at least two different bearer channels.

15 Claims, 2 Drawing Sheets

MOBILE COMMUNICATION TERMINAL AND SYSTEM WITH A MOBILE COMMUNICATION TERMINAL

CROSS-REFERENCE TO RELATED PATENT APPLICATIONS

This patent application is a continuation of PCT/EP2016/052949, filed Feb. 12, 2016, which claims the benefit of U.S. Provisional Patent Application No. 62/278,557, filed Jan. 14, 2016, the entire teachings and disclosure of which are incorporated herein by reference thereto.

FIELD OF THE DISCLOSURE

The subject matter relates to a mobile communication terminal as well as to a server arranged for communicating with mobile communication terminals.

BACKGROUND OF THE DISCLOSURE

Mobile communication is nowadays in most cases characterized by a connection-oriented communication between two communication terminals. In such a way, a mobile communication terminal establishes a bearer channel to a base transceiver station (BTS), via which wireless communication is possible. On the network side, the base transceiver station (BTS), the base station controller (BSC) and various other network nodes (HLR, VLR, GNS, GGSN, etc.) enable establishing a connection-oriented communication channel with a further communication terminal, which may be a mobile communication terminal or a fixed line communication terminal.

Data packets are exchanged between the mobile terminal and the base transceiver station, which data packets correspond to modulated speech data or other data originating from the mobile communication terminal or to be terminated within the mobile communication terminal.

There are nowadays several standardized protocols established, via which a mobile communication terminal is capable of communicating with a base transceiver station. Such protocols are, for instance 3G, UMTS, LTE, 4G and many others. Besides these cellular communication protocols, there are other protocols in place, via which a communication between a mobile terminal and a transceiver is possible, which are, for instance Wireless LAN, TETRA, Bluetooth, Near Field Communication (NFC) and many others.

All of the mentioned communication protocols allow establishing a bearer channel, via which data can be transported bi-directionally. All of the named protocols fall within the scope of the present application.

However, there is a shortcoming in current communication infrastructure, that once a bearer channel has been established by a mobile communication terminal, this bearer channel is to be used for all subsequent communication. Thus, all data packets of a communication stream are sent via this particular bearer channel. Moreover, it may happen that a user is bound to a certain service provider, which service provider dictates, which frequencies to be used and also, which protocol to be used. However, do to constraints on the air interface, different wireless bearer channels have different quality parameters. It thus may happen that at a single location, a user may have weak signal strength of a service of a first technology by a first service provider, whereas the signal strength of a service of the first or a second technology by a second service provider is much higher and communication via such a bearer, i.e. the network of the second service provider, would be more beneficial. Thus, since the user is depended on his service provider and/or bound to a certain technology, even if there is a stronger signal of a different service provider and/or different technology, the user might not be allowed to access this better signal. This restriction may be hardware or software dependent.

It is thus the aim of the present application to provide for improved communication capabilities using a mobile communication terminal.

BRIEF SUMMARY OF THE DISCLOSURE

These and other objects are solved by the mobile terminal according embodiments disclosed herein as well as a server according to embodiments disclosed herein.

The inventors have found that mobile communication terminals are capable of communicating via different frequencies and thus different bearer channels. Moreover, different bearer channels may be provided using different technology. Different bearer channels may also apply for different service providers. Bearer channels may, for instance, be bearer channels using 3G, UMTS, LTE, 4G, 5G or the like. Moreover, bearer channels may be established using Wireless LAN (e.g. IEEE 802.11 and similar protocols), Bluetooth, NFC, DECT, TETRA and the like. It has been found that within a single device, there are provided different hardware functionalities to communicate via different kinds of protocols and frequencies. The inventors found that communication can be improved, if for one single data stream the corresponding data packets are transported via different bearer channels.

Bearer channels can be established on different media, e.g. the different protocols, different service providers and the like, at the same time. Then, the various bearer channels can be used to transport one or several of data packets of a single data stream, where the inventors propose to switch within one data stream between different bearer channels to thus enable using, for instance, for each data packet the most suited bearer channel.

In order to enable sending data via various bearer channels using only one terminal, first of all a data generating unit is provided arranged for generating a data stream. A type of data stream may, for instance, be a stream of speech data, music data, video data or the like. Another type of data stream may be a stream of data corresponding to a certain file to be transferred or corresponding to a text message or the like to be transferred.

A data stream can be serialized using a data serialization unit. This data serialization unit is arranged for segmenting the data stream into at least two distinct data packets. The data packets each contain a header and a payload. Within the header, there may be provided information relating to the data stream the data packet belongs to. Moreover, within the header there may be provided address information, which can be used by a communication unit within the mobile communication terminal. The address field may be filled within the communication unit dependent on the addressee of the data packet. In the payload, modulated information from the data stream may be stored. The size of a data packet may vary. Also, the size of a data packet may be fixed. The maximum size of a data packet may be dependent on the bearer channels available. Thus, if only constrained bearer channels are available, a maximum size of a data packet may be reduced depending on information about a bearer channel in order to enable the data packet to be transferred via all available bearer channels.

Once the data packets are created, it needs to be decided, via which bearer channel this particular data packet is to be transported. In order to enable this decision, there is provided, within the mobile communication terminal, a channel broker unit. The channel broker unit is connected to the serialization unit to receive, also including receiving only information about the at least two data packets. Based on information about the data packets, as well as based on other information, the channel broker unit may select for each of the data packets a bearer channel out of at least two different bearer channels. The mobile communication terminal enables a communication via various bearer channels, and the data packets can be transported using any one of the available bearer channels. Which bearer channel is selected for each data packet, may be decided by the channel broker unit.

The bearer channels are established using a communication unit. The communication unit may be comprised of various communication processors, each being capable of communicating using different protocols, frequencies and the like. For instance, it may be possible that a communication unit establishes a bearer channel using a cellular communication network simultaneously with establishing a bearer channel using wireless LAN and moreover simultaneously with establishing a bearer channel using Bluetooth. All available air interfaces may be used to establish bearer channels.

As has been mentioned above, the variety of different bearer channels is large. For instance, different bearer channels may be provided which are packet-oriented. Moreover, bearer channels may be provided, which are connection-less. These bearer channels may all be used to transport data packets of one single data stream.

The bearer channels are established simultaneously such that two consecutive data packets may be transported using two different bearer channels without the need to first establish a bearer channel to transport a respective data packet.

According to an embodiment, the channel broker unit forwards information about a selected bearer channel for at least one of the data packets to the communication unit. It has to be understood that the channel broker unit may be comprised within the communication unit. The channel broker unit is the unit, which is capable of selecting the respective bearer channel for a certain data packet. Once this selection has been finalized, the communication unit is instructed to transmit the respective data packet via the selected bearer channel. In order to enable the communication unit to do so, the information about the selected bearer channel is forwarded to the communication unit.

According to an embodiment, the communication unit outputs the data packets on the bearer channels corresponding to the received information about the selected bearer channels.

The channels broker unit and the communication unit can be comprised within one single unit. Moreover, the functionality of the channel broker unit and/or the communication unit may, at least in parts, be provided using one single processor. The information about the bearer channel within which the data packets of a data stream are transported is output. This output may be via the channel broker unit and/or the communication unit. This information allows putting the data packets at the receiving end back into one single data stream.

In order to enable the data stream to be reassembled, the data packets may comprise, for instance within their header field, timestamp information, in particular encoding timestamp information. Also, it may be possible to code sequence information within the data packets, with information corresponding to the respective position within the data stream of a certain data packet.

According to an embodiment, the channel broker unit and/or the communication unit outputs a mapping between the data packets and the bearer channels, within which the respective data packets are transported. As has been described above, the data packets of a single data stream may be transported using various different bearer channels. In order to put the data stream together again at the receiving end, all data packets on all used bearer channels need to be received and reassembled into a data stream. It thus needs to be known at the receiving end, on which bearer channel which data packet is mapped. Such mapping information may be sent regularly from the originating terminal to the terminating terminal.

According to an embodiment, the communication unit outputs the information about selected bearer channels on a baseline channel. It has been found that it is advantageous to establish a baseline channel between the originating terminal and the terminating terminal, which may be either a server or a mobile terminal. This baseline channel is preferably connection-oriented. The baseline channel can have a smaller bandwidth than the bearer channels, since on the baseline channel only control information is transported. Such control information may comprise the mapping information between bearer channels and data packets as well as information about the data streams to be transported and the like.

The use of a best available bearer channel is possible even if, according to one embodiment, the channel broker unit selects for at least two consecutive data packets two different bearer channels. By this, a switch between bearer channels is possible between two different data packets of a same data stream.

According to an embodiment, the data broker unit monitors bearer channel parameters and selects the bearer channel depending on the monitored channel parameters. Channel parameters may, for instance, be the transmission technology, like for instance Wireless LAN, mobile cellular communication, for instance GSM, LTE, 3G, NEXT, 4G, 5G, Near Field Communication, Bluetooth or the like. Channel parameters may also be information about a service provider of the respective bearer channel. Moreover, channel parameters may be information about cost of a bearer channel, i.e. the cost of transmission of a certain amount of data via this bearer channel. This cost information may also comprise cumulated capacity already been transported via this bearer channel, i.e. considering flat rate tariffs on certain bearer channels, which should be used up to the agreed on maximum data volume, but not beyond. Channel parameters may also comprise information about signal strength and/or signal to the noise (SNR) on certain bearer channels and/or bit error rates (BER), etc. Moreover, the transmission capabilities, in particular the bandwidth and speed of transmission may be comprised within channel parameters. Another channel parameter may be its accessibility, as well as the tariff of the bearer channel. All these parameters can be taken into consideration, and for instance be weighted in order to find the most appropriate bearer channel for each data packet.

It may also be possible to select for a certain number of consecutive data packets, for instance 10, 20, 50, 100 consecutive data packets, one bearer channel to be used. This reduces the time spent for selecting the bearer channel individually for each single data packet.

According to an embodiment, the data broker unit receives user preferences and selects the bearer channels also depending on the user preferences. Cumulatively or alternatively to the bearer channel parameters, user preferences may be taken into account for selecting the appropriate bearer channel. User preferences may, for instance be preferences for a certain service provider, preferences for a certain technology, i.e. GSM, UMTS, W-LAN, TETRA, NFC, Bluetooth or the like, preferences regarding pricing, preferences regarding signal quality and the like. All user preferences may be requested by the user in an installation step, using a user interface. User preferences may change and new user preferences may be taken into account for bearer channel selection.

Moreover, cumulatively or alternatively to the above selection process, the broker unit may monitor terminal parameters and may select the bearer channel depending on the monitored terminal parameters. For instance, power consumption may be different on a different bearer channels and depending on the battery state of charge, a bearer channel selection may apply. Other terminal parameters may also influence bearer channel selection process.

According to an embodiment, the data broker unit changes a selected bearer channel for succeeding data packets in response to a bearer channel selection signal. It may happen that a certain bearer channel is used for consecutive data packets. If on the receiving end it is found that the selected bearer channel is inappropriate, for instance that the quality of the bearer channel deteriorates towards the receiving end, a bearer channel selection signal may be issued. Upon reception of such a bearer channel selection signal, the originating terminal may change the selected bearer channel in order to improve the quality of the bearer channel at the receiving end. Also, the receiving end may have other constrains, which might require a change of the bearer channel upon which the bearer channel selection signal is issued. The bearer channel selection signal can simply be a bearer channel change indication or can contain information about the bearer channel actually to be selected.

According to another aspect, there is provided a mobile terminal for receiving data packets. The data packets to be received on the respective mobile terminal are data packets, which have been issued on various bearer channels according to the above description. In order to receive the appropriate data packets, a channel selection unit is arranged for selecting at least two different bearer channels for reception of data packets belonging to a common data stream. The selection process may be carried out based on a mapping received from the originating terminal. Also, the receiving terminal may monitor a baseline channel in order to determine, which bearer channels are used and which data packets are sent on which bearer channels.

The received data packets need to be recombined to create the data stream. Thus, there is provided a data combination unit arranged for combining the at least two data packets received on different bearer channels into one data stream. At the output of the data combination unit, the original data stream is reassembled and can be used for presentation to the user.

As has been mentioned above, the receiving mobile communication terminal need to know which bearer channels are used. For this reason, the mobile communication terminal may comprise a communication unit, which is connected to at least one baseline channel and at least two bearer channels. Using the baseline channel, the mobile terminal, respectively the communication unit may receive information about which bearer channels are used for which data packets. Once the information is known, bearer channels may be established and data packets from the bearer channels may be obtained.

According to another embodiment, the communication unit receives on the baseline channel information about the selected bearer channels and connects to the selected bearer channels. It may happen that the bearer channels are not established yet on the receiving terminal. In order to allow the data packets to be received on the receiving terminal, the receiving terminal first establish a bearer channel on which data packets are to be transmitted and then receives the corresponding data packets.

Another aspect is a server arranged for receiving data packets from a mobile communication terminal according to claim 1. It has been found that it is not always possible to establish end-to-end bearer channels between an originating terminal according to claim 1 and a terminating terminal according to claim 14. In order to enable communication with a terminal being capable of using only a limited set of bearer channels, in particular only one bearer channel, an intermediate server is provided. The bearer channels between the originating terminal and the server may be established and the data packets may be transported through these different bearer channels from the originating terminal to the server. On the server side, there is provided a channel selection unit arranged for selecting at least two different bearer channels for reception of data packets belonging to a common data stream. The selection unit may select the bearer channels based on preselected settings. This means that there may be an agreement between the originating terminal and the server, which bearer channels might be used. All these bearer channels are considered by the channel selection unit.

In addition, on the server there is a data combination unit, which is arranged for combining the at least two data packets receiving on different bearer channels into at least one data stream. The reassembly of the data stream may use the header information of each data packet in order to assign the data packet to a certain data stream and to ensure that the data stream is in the correct order of information. Once the data stream has been created, it can be sent to the terminating terminal using only one single bearer channel. Therefore, the server may comprise a communication unit arranged for transmitting the data stream on an output bearer channel to a communication terminal.

It needs to be understood that the aspects of the above mobile terminal and server may be implemented as hardware and/or software solutions. In particular, there may be provided processors, which are capable of carrying out the tasks of the different units. Moreover, it needs to be understood that all features described above and herein below can be combined. It is not necessary to use all features of one of the independent claims, but rather the scope extends to any combination of any features described herein below as well as above.

BRIEF DESCRIPTION OF THE SEVERAL VIEWS OF THE DRAWING

In the following, the subject matter will be described in more detail with referenced to the Figures. In the Figures show.

DETAILED DESCRIPTION OF THE DISCLOSURE

Figure 1:
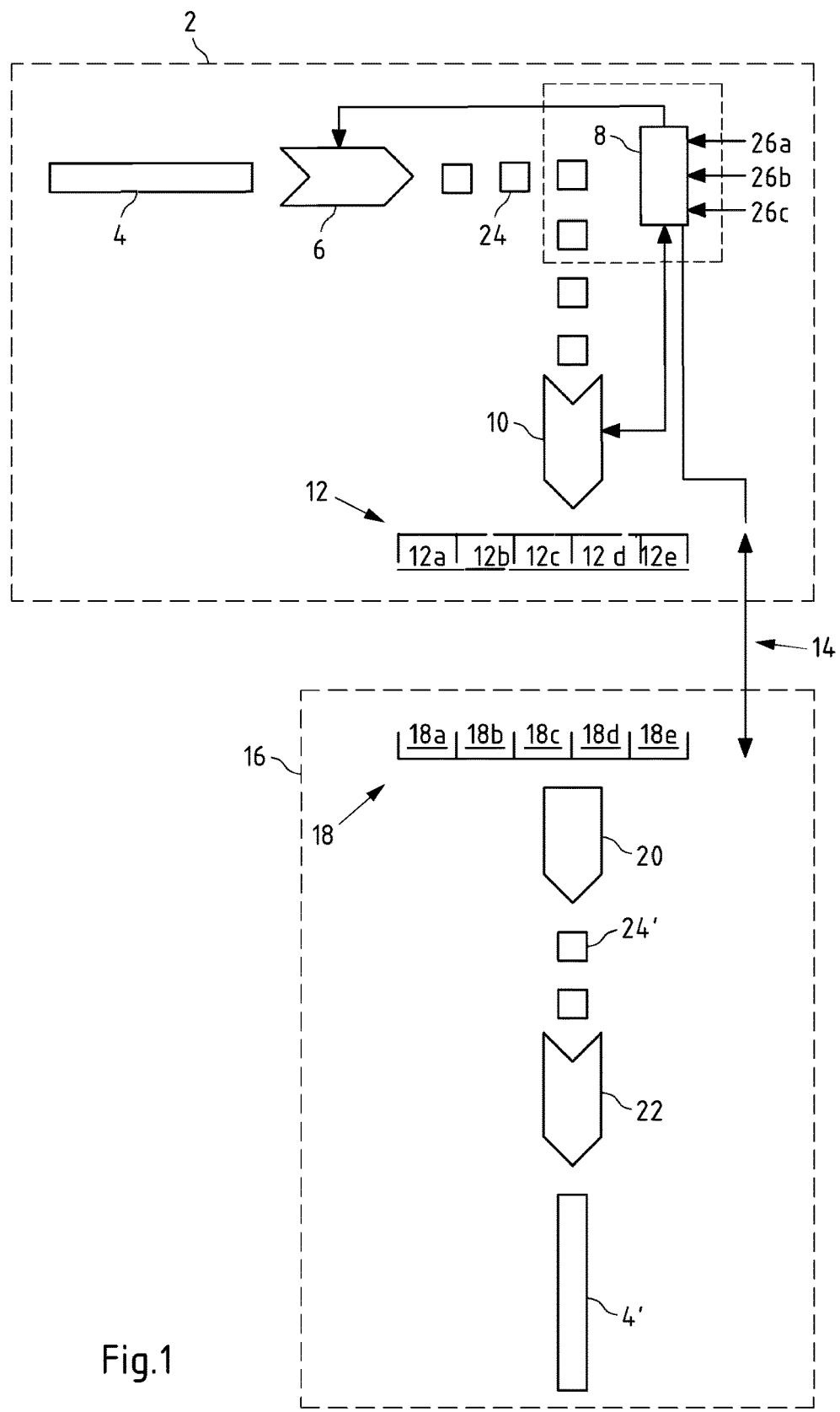
FIG. 1 shows a schematic overview of a system according to an embodiment.

FIG. 1 illustrates a schematic overview of a system according to embodiments. Therein, a first mobile terminal 2 is indicated. The mobile terminal 2 can be understood as originating terminal, since from this mobile terminal 2 data originates. Within the mobile terminal 2 there is provided a data generating unit (not shown), which generates a data stream 4.

Moreover, within the mobile terminal 2, there is provided a data serialization unit 6, a channel broker unit 8, and a communication unit 10. The communication unit 10 may establish various bearer channels 12 as well as a baseline channel 14.

In particular all bearer channels 12 as well as the baseline channel 14 may be wireless communication channels. It may also be the case that the baseline channel 14 forms part of one of the bearer channels 12.

On a receiving end, there is provided a server 16. Within the server 16, again various bearer channels 18 can be received within a communication unit 20. The communication unit 20 puts out the received data packets from the various bearer channels 18 into a combination unit 22. The combination unit 22 accounts for de-serialization of the data packets into a data stream 4'.

Since the data packets 24 not only contain payload, but also contain information about their sequence and information about which data stream 4, 4' they belong to, the combination unit 22 is capable of reassembling the data stream 4', which represents the initial data stream 4.

Server 20 is further capable of transmitting the data stream 4' via a dedicated bearer channel (not illustrated). Such a bearer channel may, for instance be established through, at least in parts, the internet, using TCP/IP or any other IP protocol. Also the data stream 4' may be transmitted via a wireless or wired communication link to a mobile terminal, which is considered to be the addressee of the data stream 4'. The addressee of the data stream 4' may be indicated by the mobile terminal 2 to the server 4 using the baseline channel 14.

As has been explained above, the channel broker unit 8 is capable of deciding, on which channel, i.e. which bearer channel 12, 18 data is to be transmitted. The bearer channel 12, 18 may be of various types, techniques, qualities and/or of various service providers. For instance, a first bearer channel 12a is a mobile communication bearer channel using for instance UMTS and being provided by service provider A. Another bearer channel 12b may be provided by a second service provider B but may also be using UMTS as bearer technology. Another bearer channel 12c may, for instance be a near field bearer channel, for instance using near field communication protocol. A further bearer channel 12d may, for instance be a Wireless LAN bearer channel, through which a communication link is established to server 16.

Eventually, a bearer channel 12e may be a low-priced, low-bandwidth mobile communication bearer channel, for instance having a certain volume tariff and being provided by service provider A.

In general, it can be concluded that various bearer channels 12a-e may be available within mobile terminal 2, which bearer channel may have different technologies and different service providers.

The channel broker unit 8 selects depending on various inputs 26a-c, which data packet 24 is to be transported via which bearer channel 12a-e.

A first input 26a may, for instance be technology driven, i.e. comprising information about certain technology constrains as well as a certain transmission techniques and service providers. Based on these input data, the data packets 24 are provided with information about which bearer channel 12 to be used. It may also be possible, that the channel broker unit 8 directly informs the communication unit 10 about the bearer channel 12 to be used for each other of the data packets 24.

Another input may, for instance be a user preference. User preferences may, for instance be quality, cost, bandwidth, and the like. These input data 26b are input to channel broker unit 8.

A further input 26c may relate to the service provider of each bearer channel. It may be provided that a certain service provider with certain accessibility and a certain tariff needs to be used.

The channel broker unit 8 processes all input data 26a-d. The input data 26a-c may include various options along which the channel broker unit 8 may chose. The channel broker unit 8 then selects for each of the data packets 24 the bearer channel 12.

Based on certain bearer channels selection criteria, the channel broker unit 8 may also feed back information about the size of a respective data packet 24 to data serialization unit 6. The data serialization unit 6 then may adapt the size of the payload of the data packet 24 depending on which bearer channel for this data packet 24 is selected.

Using a dedicated baseline channel 14, the channel broker unit 8 or the communication unit 10 may communicate to the server 16 information about a mapping between data packets 24 and respective bearer channels 12a-e. Moreover, it may be possible that the baseline channel is used to communicate to the server 16, which bearer channels 12a-e are at all used. All these bearer channels 12a-e are used at the receiving end on the server 16 on respective bearer channels 18a-e.

For each bearer channels 12a-e there is a corresponding bearer channel 18a-e on the server 16. Depending on which bearer channels are used, this information is transmitted via the baseline channel 14 to the server 16. Communication unit 20 on server 16 then needs only to monitor the respective bearer channels 18a-e, which might be used, i.e. on which the channel broker unit 8 directs a data packet 24.

By means of the channel broker unit 8 and the various bearer channels 12, 18, it is possible to improve service quality and to enable the full arrange of transmission capabilities of mobile terminal 2 for one dedicated communication.

Figure 2:
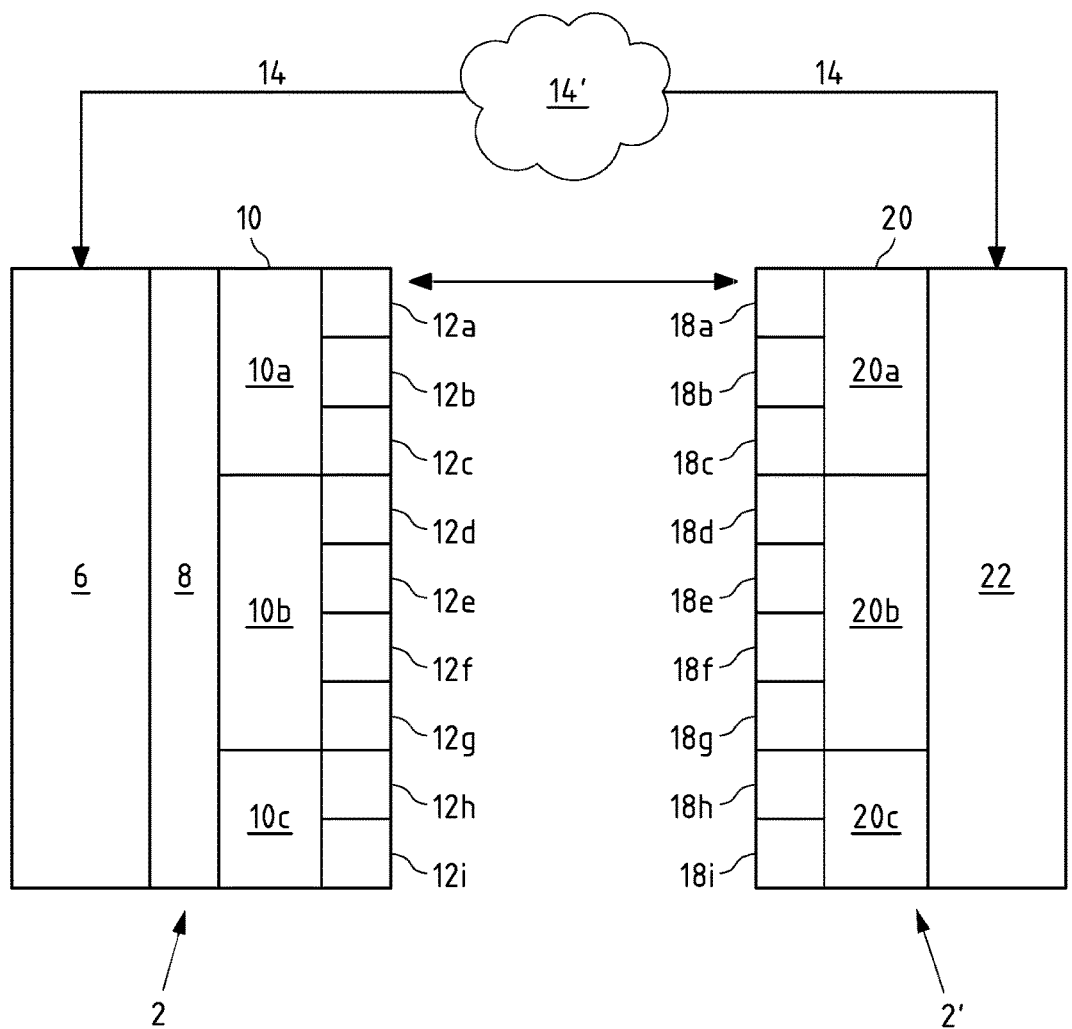
FIG. 2 shows a further schematic overview of a system according to an embodiment.

FIG. 2 illustrates a further embodiment with an originating mobile terminal 2 and a terminating mobile terminal 2'. However, the structure of FIG. 2 may also apply to a server, which replaces the terminating mobile terminal 2'. Within mobile terminal 2', there may be established, using a communication unit 10, a baseline channel 14 to terminating mobile terminal 2'. The baseline channel 14 may be established, for instance, through a wide area network 14', which may, for instance, be the Internet.

Within mobile terminal 2, there is provided the data serialization unit 6 though which all data passes through. The once packetized data stream is output from data serialization unit 6 and input to channel broker unit 8. Channel broker unit 8 operates similar to channel broker unit 8 as illustrated in FIG. 1. Depending on certain inputs due to technology constrains, service provider constrains, user preferences, and the like, the channel broker unit 8 decides for each packet preferably individually, which bearer channel 12 to use.

The packets are then output on different instances 10*a-c* of communication unit 10. This means that, for instance, an instance 10*a* may be a communication instance for communicating using a cellular mobile telecommunication network. This instance 10*a* may establish various bearer channels 12*a-c*, which may relate to various service providers and/or various technologies/protocols to be used via the mobile communication network.

A second instance 10*b* may be, for instance, a near field communication instance, through which various bearer channels 12*b-g* may be established. These bearer channels 12*g-e* may, for instance use different technologies.

A third instance 10*c* may, for instance, be a wireless communication instance, being capable of setting up various bearer channels 12*h, i*, which may, for instance be Wireless Local Area Network channels, for instance using IEEE802.11 or any other similar protocol. For instance different bearer channels may be established with different wireless LANs, for instance having different SSIDs. Many other instances 10*a-c* may be possible, for instance using DECT technology, TETRA technology or any other mobile communication technology. The channel broker unit 8 is capable of selecting out of various bearer channels 12*a-i* being provided through the instances 10*a-c*.

Which of the bearer channels 12*a-i* are used, is communicated via the baseline channel 14 to the terminating mobile terminal 2'. At the terminating mobile terminal 2', depending on which bearer channels 12*a-i* have been used on the originating mobile terminal 2, different instances 20*a-c* of communication unit 20 may establish different bearer channels 18*a-i*.

For instance, when using bearer channels 12*a-c*, corresponding bearer channels 18*a-c* may be established.

There are bearer channels that are already terminated near the originating mobile terminal 2. The further communication paths may then be through different channels (i.e. WAN, Internet and the like), for instance through over the top (OTT) service providers, having dedicated servers. Such bearer channels are for instance near filed bearer channels and wireless LAN bearer channels. The receiving mobile terminal 2' then needs to set up a communication link 18*d* to such an OTT server. Which OTT service is used, may be indicated via the baseline channel 14.

The same may apply for wireless local area network bearer channels 12*a-i*, which communication may then be routed via the internet using internet protocol to an addressee, which is identified by bearer channel 18*i*. The various instances 20*a-c* pass on the received data packets to communication unit 22, which reassembles the data packets 24 depending on their header information into the correct order in order to put out the data stream, which has been input into data serialization units 6.

By means of the mobile terminal and the system described herein above, it is possible to direct communication between two communication partners through various bearer channels simultaneously, such that capabilities of various bearer channels can be used during one communication link.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A mobile communication terminal, comprising:
   a data generation unit arranged for generating a data stream;
   a data serialization unit arranged for segmenting the data stream into at least two distinct data packets; and
   a channel broker unit, wherein the channel broker unit is connected to the serialization unit to receive the at least two data packets and to select for each of the data packets a bearer channel out of at least two different bearer channels;
   wherein the channel broker unit and/or the communication unit outputs a mapping between the data packets and the bearer channels on which the respective data packets are transported on a baseline channel.

2. The mobile communication terminal of claim 1, wherein a communication unit is arranged for establishing a plurality of bearer channels simultaneously.

3. The mobile communication terminal of claim 2, wherein the communication unit is arranged for establishing at least one packet oriented, in particular connectionless bearer channel.

4. The mobile communication terminal of claim 2, wherein the channel broker unit forwards information about a selected bearer channel for at least one of the data packets to the communication unit.

5. The mobile communication terminal of claim 4, wherein the communication unit outputs the data packets on the bearer channels corresponding to the received information about the selected bearer channel.

6. The mobile communication terminal of claim 1, wherein the channel broker unit and/or the communication unit outputs information about the bearer channels within which data packets of a data stream are transported.

7. The mobile communication terminal of claim 1, wherein the channel broker unit selects for at least two consecutive data packets two different bearer channels.

8. The mobile communication terminal of claim 1, wherein the data broker unit monitors bearer channel parameters and selects the bearer channel depending on the monitored channel parameters.

9. The mobile communication terminal of claim 1, wherein the data broker unit receives user preferences and selects the bearer channel depending on the user preferences.

10. The mobile communication terminal of claim 1, wherein the data broker unit monitors terminal parameters and selects the bearer channel depending on the monitored terminal parameters.

11. The mobile communication terminal of claim 1, wherein the data broker unit changes a selected bearer channel for succeeding data packets in response to a bearer channel selection signal.

12. A mobile communication terminal, comprising:
   a channel selection unit arranged for selecting at least two different bearer channels for reception of data packets belonging to a common data stream;
   a data combination unit arranged for combining the at least two data packets received on different bearer channels into one data stream;
   wherein a mapping between the data packets and the bearer channels on which the respective data packets are received on a baseline channel.

13. The mobile communication terminal of claim 12, wherein a communication unit is connected to at least one baseline channel and at least two bearer channels.

14. The mobile communication terminal of claim 12, wherein the communication unit receives on the baseline channel information about selected bearer channels and connects to the selected bearer channels.

15. A server arranged for receiving data packets from a mobile communication terminal of claim 1, comprising:
   a channel selection unit arranged for selecting at least two different bearer channels for reception of data packets belonging to a common data stream;
   a data combination unit arranged for combining the at least two data packets received on different bearer channels into one data stream;
   wherein a mapping between the data packets and the bearer channels on which the respective data packets are received on a baseline channel;
   a communication unit arranged for transmitting the data stream on an output bearer channel to a communication terminal.

* * * * *